June 19, 1934.   W. M. ROBINSON ET AL   1,963,421
JOINT
Filed April 28, 1930

Ward M. Robinson,
Harold K. Rader,
Inventors,
Delos G. Haynes,
Attorney.

Patented June 19, 1934

1,963,421

UNITED STATES PATENT OFFICE 1,963,421

JOINT

Ward M. Robinson and Harold K. Rader, Port Huron, Mich., assignors to Mueller Brass Co., Port Huron, Mich., a corporation of Michigan Application April 28, 1930, Serial No. 448,090

1 Claim. (Cl. 285—115)

This invention relates to joints, and with regard to certain more specific features, to joints adapted to be used between pipes and fittings or the like.

Among the several objects of the invention may be noted the provision of a joint of a telescoping type adapted to have solder or other cementitious mass of material introduced to form a seal; the provision of a joint of the class described in which said cementitious mass is, at least in part, fed in from one end of the joint after said mass has been melted; and the provision of a joint of the class described in which said cementitious mass positions itself by a capillary phenomenon. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claim.

Figure 1:
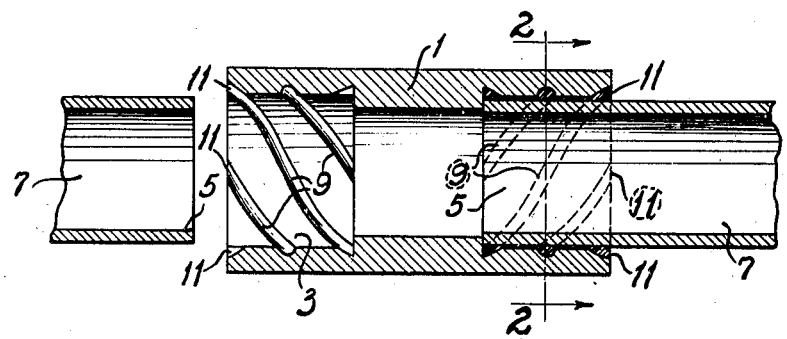
Figure 2:
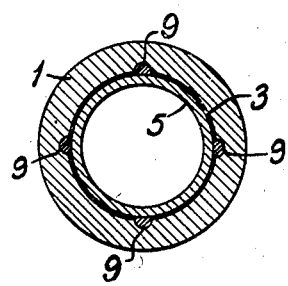

In the accompanying drawing, in which are illustrated one of various possible embodiments of the invention, Fig. 1 is a sectional view of one form of the invention; and, Fig. 2 is a cross section taken on line 2—2 of Fig. 1.

Similar reference characters indicate corresponding parts throughout the several views of the drawing.

Referring now more particularly to Fig. 1, there is illustrated at numeral 1 a plumbing or like fitting, the shape, contour and application of which as shown in the drawing is exemplary. This fitting 1, at each point that a pipe is to be fastened thereto is provided with a relatively smooth or plain bore 3 adapted to telescopingly receive the relatively smooth or plain end 5 of a length of pipe 7. The clearance between the diameter of the end 5 and bore 3 may be of the order of a few thousandths of an inch.

The face or bore 3 is provided with a plurality of helical or like grooves 9 which proceed with a longitudinal and angular component from the exterior of the fitting across said face. Each groove 9, at its terminus at the end of the fitting, provides an opening 11, through which solder may be applied axially of the joint.

The parts described, in application, are telescoped. External heat is then applied to the fitting and/or end of pipe 7 by a blow torch or the like and solid solder or similar cementitious material is fed into position axially, that is, externally at the outside and at the openings 11 of the grooves 9 at one end of the joint. Thus the solder is applied at the exterior juncture between the members 1 and 7. The solder or cement is thus caused to melt to a liquid and being in contact with the heated portions of the pipe 7 and fitting 1 runs inwardly through the grooves 9 and thence is driven by capillary action, it is believed, into the joint and around the same so that all or substantially all juxtaposed surfaces between the pipe and fitting are joined and sealed. The solder is conducted by the grooves 9 all the way to the end of the portion 5 which projects into the fitting and encompasses substantially the entire surface thereof. It is to be understood that the parts are suitably cleaned before assembly, so that the solder will adhere properly.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

We claim:

A joint comprising, in combination, a fitting member having a socket, and an entering member telescoping with said socket, said fitting member and said entering member having a space therebetween adapted to effect capillary spreading of a then-liquid sealing material introduced therebetween, and means for introducing said sealing material comprising a plurality of helical grooves in the face of said socket, said grooves each extending to the outer end of said fitting to provide openings, one for each groove, whereby sealing material may be applied to the joint at said openings axially of the joint.

WARD M. ROBINSON.
HAROLD K. RADER.